Figure 1:
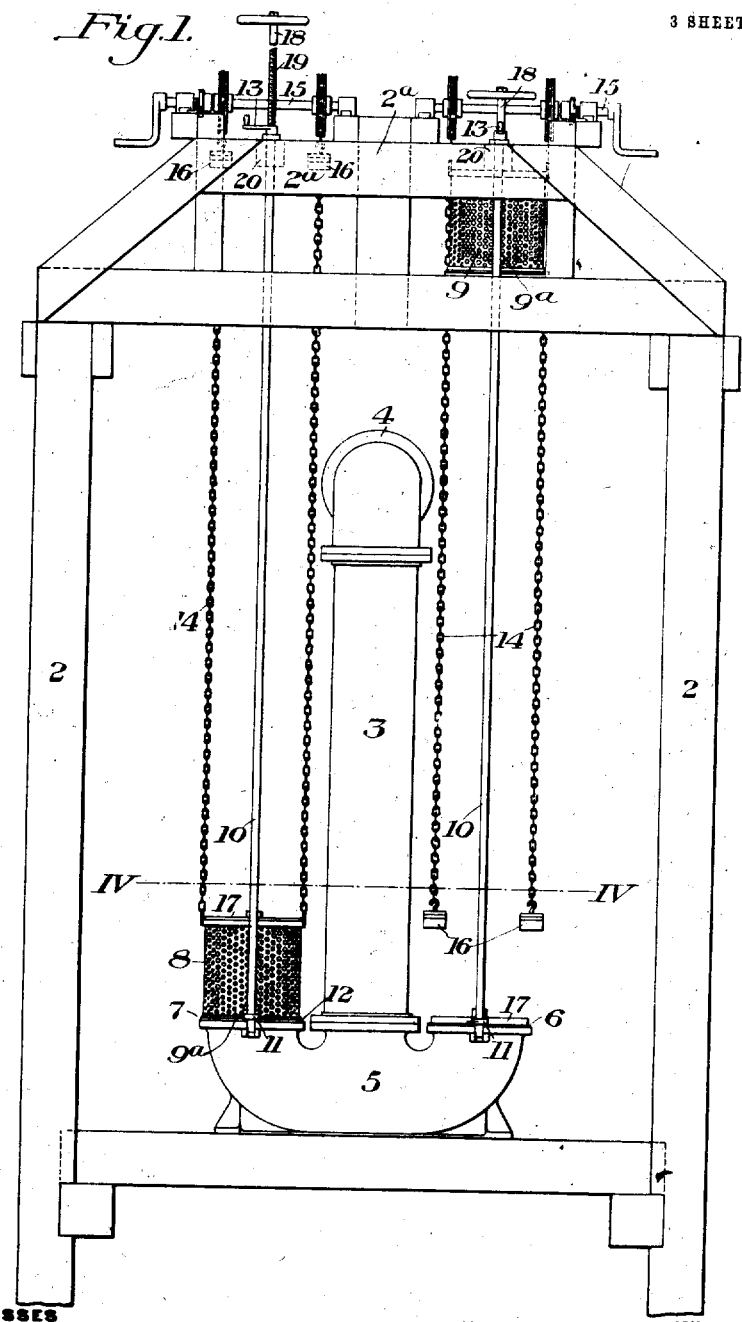

W. S. ELLIOTT.
STRAINER.
APPLICATION FILED FEB. 10, 1910.

974,044.

Patented Oct. 25, 1910.

3 SHEETS—SHEET 1.

WITNESSES
R. A. Balderson
Walter Famaries

INVENTOR
Wm. S. Elliott,
by Bakewell, Byrnes & Parmelee
his Attys.

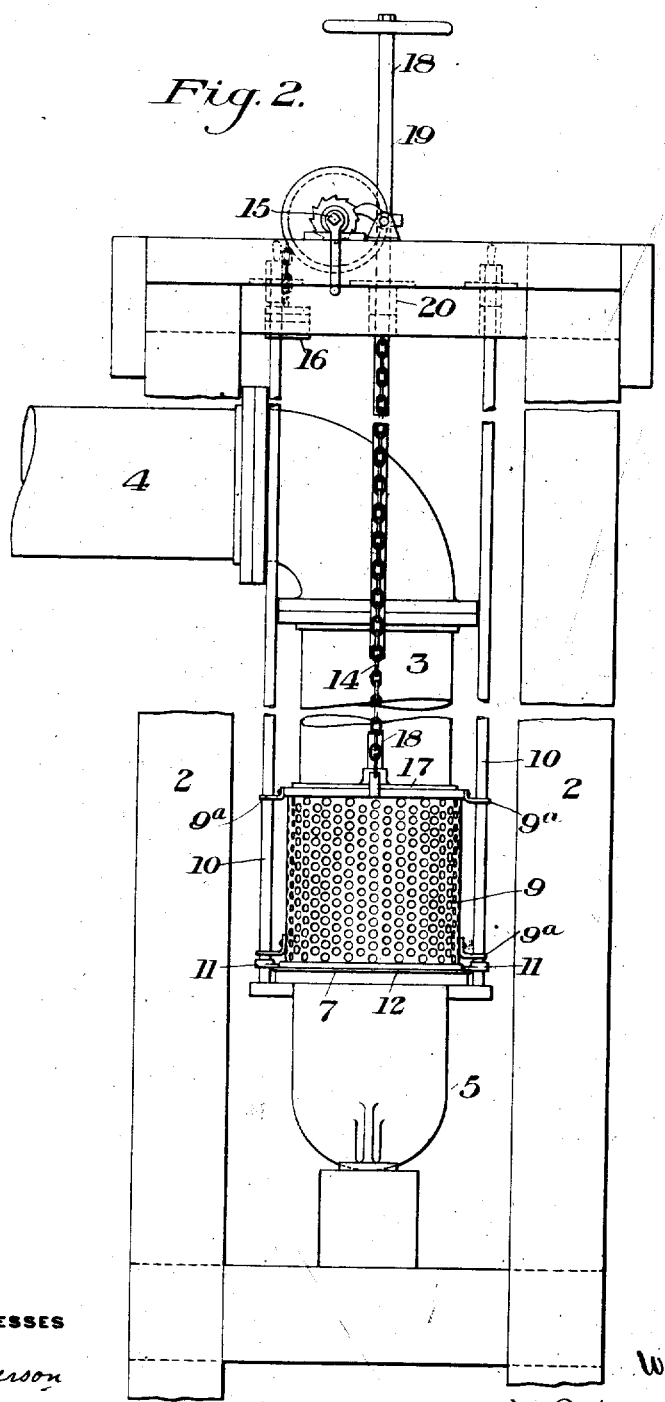

W. S. ELLIOTT.
STRAINER.
APPLICATION FILED FEB. 10, 1910.
974,044.
Patented Oct. 25, 1910.
3 SHEETS—SHEET 3.
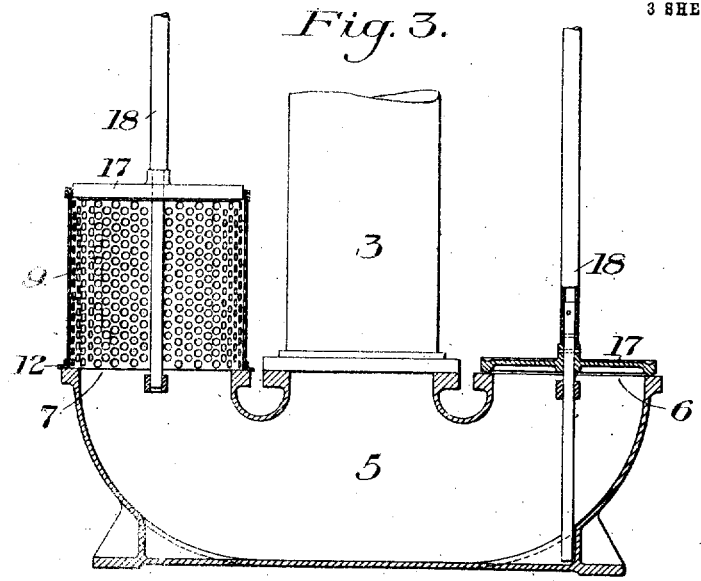
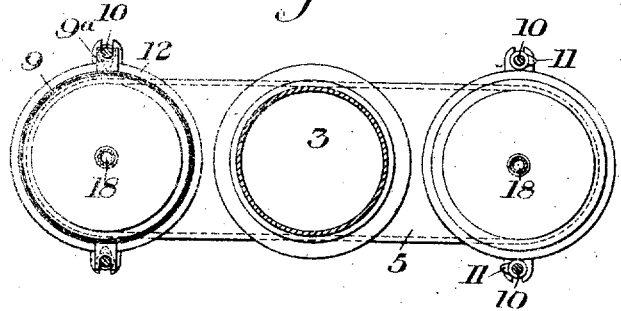
WITNESSES
R. A. Balderson
Walter Fairaris
INVENTOR
Wm. S. Elliott
by Bakewell, Byrnes & Parmelee
his Attys.

UNITED STATES PATENT OFFICE.

WILLIAM S. ELLIOTT, OF PITTSBURG, PENNSYLVANIA.

STRAINER.

974,044.

Specification of Letters Patent.   Patented Oct. 25, 1910.

Application filed February 10, 1910.  Serial No. 543,059.

*To all whom it may concern:*

Be it known that I, WILLIAM S. ELLIOTT, of Pittsburg, county of Allegheny, State of Pennsylvania, have invented a new and useful Improvement in Strainers, of which the following is a full, clear, and exact description, reference being had to the accompanying drawings, forming part of this specification.

My invention has relation to strainer apparatus, and more particularly, to strainer apparatus which is designed to be submerged in a lake, pond, reservoir, or other body of water.

The object of my invention is to provide apparatus of this kind, which is simple and inexpensive in the construction and in which the intake or strainer parts are in duplicate, and are so constructed and arranged that either branch of the intake may be separately used, while the other branch may be closed and the strainer element raised to the surface for cleaning, repairs, etc.

The nature of my invention will be best understood by reference to the accompanying drawings, in which—

Figure 1 is a front elevation of strainer apparatus embodying my invention; Fig. 2 is a side view of the same partly broken away; Fig. 3 is a vertical section of a portion of the apparatus; and Fig. 4 is a section on the line IV—IV of Fig. 1.

Referring to these drawings, the numeral 2 designates a supporting framework which may be of any suitable construction and which is set within the body of water from which the supply of water is to be taken. This framework is of sufficient height, so that its upper portion will project above the surface of the water.

3 designates a vertical pipe having an offtake connection 4, at its upper end and a branched intake 5 at its lower end, the lower end of the pipe 3 being connected to the intake between its two inlet ports 6 and 7.

8 and 9 designate two perforated strainer cages or baskets which may be of perforated metal, wire cloth, or of any other usual or suitable character, and which are arranged to seat upon the respective branches of the intake over the inlet ports 6 and 7. Each strainer cage or basket is provided with guide lugs or projections 9ª, which have a sliding engagement with vertical guide rods 10, which are secured at their lower ends to the intake connection and which extend upwardly and are provided with bearings at their upper ends in one of the top frame members 2ª. These rods are also preferably provided near their lower ends with buttons 11, which, by rotation of the rods, may be turned so as to engage the bottom flanges 12 of the strainer cages or baskets, and thus hold said cages or baskets securely to their seats over the inlet ports. For this purpose of actuating these rods to set and release the buttons, they may be provided with handles or cranks 13, at their upper ends.

The strainer cages or baskets are raised or lowered by means of chains, cables or the like 14, which extend from the baskets upwardly and over winding shafts 15, journaled at the upper portion of the frame 2, a separate shaft 15 being provided for each cage or basket. The free ends of the chains or cables are preferably counterweighted, as shown at 16.

Each cage or basket is provided with a valve plate 17, which, when the cage or basket is in position for use, is seated within and closes the upper and otherwise open end of the cage or basket, to prevent the direct entrance of water thereto. Each of these valve plates is carried by a vertical rod 18, which extends upwardly through the framework and has a threaded portion 19 near its upper end, which works in a nut 20. The valve plates are of proper diameter to properly close the upper ends of the cages or baskets and to be moved through the baskets so that when one of the baskets is raised, the corresponding valve plate can be moved downwardly by means of its actuating rod, to close the inlet port.

The operation will be readily understood. Normally but one of the cages or baskets will be in use, as shown in Fig. 1, the other basket being raised to the top of the frame or support 21 and the corresponding valve being moved down to close the inlet port at that side. Whenever the basket or cage which is in use becomes clogged or requires cleaning, the other cage or basket is lowered by the operation of the winding shaft, its valve plate is raised in a position to close the upper end of the cage or basket, the other valve plate is lowered to close its inlet port, and the cage or basket to be cleaned is raised to the surface. In this manner, one of the strainer cages or baskets may always be in condition and position for use. If it is desired, both cages or baskets can be used at the same time and may be alternately raised for cleaning.

It will be obvious that various changes can be made in the details of construction and arrangement of the parts. Thus, any suitable means may be employed for raising and lowering the baskets and for guiding them in their movements, the valves may be actuated in any other suitable manner, and other changes may be made without departing from the spirit and scope of the invention, as defined in the appended claims.

I claim:

1. In strainer apparatus of the character described, a branched intake, and a strainer element arranged to seat over the inlet port of each branch of the intake, means for separately raising and lowering the strainer elements, and a valve member for each strainer element which in one position closes the inlet port in that branch of the intake and in the other position closes the upper end of the strainer element, substantially as described.

2. In strainer apparatus of the character described, a branched intake, and a strainer element arranged to seat over the inlet port of each branch of the intake, means for separately raising and lowering the strainer elements, and a valve member for each strainer element which in one position closes the inlet port in that branch of the intake and in the other position closes the upper end of the strainer element, said valve member being movable through the strainer element, and means for actuating said member, substantially as described.

3. In strainer apparatus of the character described, a suitable support adapted to be submerged in a body of water, an offtake pipe having a branched intake connection at its lower end, a plurality of strainer elements adapted to seat over the inlet port of one of the branches of the intake connection, means for separately raising and lowering the strainer elements mounted upon the upper portion of the support, guides for the strainer elements, and valve means arranged to alternately close each inlet port and the upper end of the corresponding strainer element, substantially as described.

4. In strainer apparatus of the character described, an intake having an inlet port, a valve seat around said port, a strainer element arranged to seat around and over the port, means for raising and lowering said element, and a valve member adapted to close the top of the strainer element in one position and to close the inlet port in another position, substantially as described.

In testimony whereof, I have hereunto set my hand.

WILLIAM S. ELLIOTT.

Witnesses:
   Geo. B. Bleming,
   R. A. Balderson.